US008830325B2

(12) United States Patent
Chaussade

(10) Patent No.: US 8,830,325 B2
(45) Date of Patent: Sep. 9, 2014

(54) GAMBLING TERMINAL HAVING A DIGITAL CAMERA

(75) Inventor: Xavier Chaussade, Paris (FR)

(73) Assignee: Morpho, Paris (FR)

( * ) Notice: Subject to any disclaimer, the term of this patent is extended or adjusted under 35 U.S.C. 154(b) by 287 days.

(21) Appl. No.: 13/122,146

(22) PCT Filed: Oct. 2, 2009

(86) PCT No.: PCT/EP2009/062850
§ 371 (c)(1),
(2), (4) Date: Mar. 31, 2011

(87) PCT Pub. No.: WO2010/040697
PCT Pub. Date: Apr. 15, 2010

(65) Prior Publication Data

US 2011/0176004 A1 Jul. 21, 2011

(30) Foreign Application Priority Data

Oct. 6, 2008 (FR) ..................................... 08 56755

(51) Int. Cl.
*H04N 9/47* (2006.01)
*G07F 17/32* (2006.01)

(52) U.S. Cl.
CPC .......... *G07F 17/3216* (2013.01); *G07F 17/329* (2013.01); *G07F 17/32* (2013.01); *G07F 17/3241* (2013.01)
USPC .......................................................... 348/150

(58) Field of Classification Search
USPC .......................................................... 348/150
See application file for complete search history.

(56) References Cited

U.S. PATENT DOCUMENTS

| | | | | |
|---|---|---|---|---|
| 5,267,149 | A * | 11/1993 | Anada et al. | 705/44 |
| 5,751,346 | A * | 5/1998 | Dozier et al. | 348/153 |
| 5,752,582 | A * | 5/1998 | Hayward | 186/61 |
| 6,003,008 | A * | 12/1999 | Postrel et al. | 705/4 |
| 6,006,681 | A * | 12/1999 | Brown et al. | 109/19 |
| 6,292,211 | B1 * | 9/2001 | Pena | 348/14.08 |
| 7,481,360 | B1 * | 1/2009 | Ramachandran et al. | 235/379 |
| 7,866,546 | B1 * | 1/2011 | Vance | 235/379 |
| 8,185,404 | B1 * | 5/2012 | McDaniel et al. | 705/1.1 |
| 2002/0005899 | A1 * | 1/2002 | Fekas et al. | 348/156 |
| 2002/0126110 | A1 * | 9/2002 | Bowron | 345/204 |
| 2003/0078849 | A1 * | 4/2003 | Snyder | 705/23 |
| 2003/0167203 | A1 * | 9/2003 | Thorne et al. | 705/14 |
| 2003/0197782 | A1 * | 10/2003 | Ashe et al. | 348/150 |
| 2004/0164141 | A1 * | 8/2004 | Egami et al. | 235/379 |
| 2005/0146845 | A1 * | 7/2005 | Moscovitch | 361/681 |
| 2010/0026808 | A1 * | 2/2010 | Kagehiro et al. | 348/152 |
| 2012/0185388 | A1 * | 7/2012 | Pranger | 705/43 |
| 2012/0205442 | A1 * | 8/2012 | Meek et al. | 235/379 |

* cited by examiner

*Primary Examiner* — Sath V Perungavoor
*Assistant Examiner* — Peter D Le
(74) *Attorney, Agent, or Firm* — Blakely Sokoloff Taylor & Zafman

(57) ABSTRACT

The invention relates to a gambling terminal comprising a mount (63) for receiving a gambling document belonging to a user and a camera able to acquire an image of the gambling document when the gambling document is placed on the mount, the terminal having a first side intended to face an operator and a second side opposite the first side and intended to face the user, in which the terminal has a first opening (14) arranged on the first side and a second opening arranged on the second side such that the gambling document can be seen simultaneously by the operator and the user while the image is being acquired.

12 Claims, 7 Drawing Sheets

GAMBLING TERMINAL HAVING A DIGITAL CAMERA

This is a non-provisional application claiming the benefit of International Application Number PCT/EP2009/062850 filed Oct. 2, 2009.

TECHNICAL FIELD

The invention relates to a gambling terminal, of the type comprising a mount for receiving a gambling document and a camera able to acquire an image of said gambling document.

STATE OF THE PRIOR ART

The function of gambling terminals is to record the participation of users in games of chance, to issue receipts and to identify the winners of said games. These terminals are generally installed in points of sale in retail outlets (particularly tobacconists), and are connected to a remote central server managed by a gambling operator. The central server makes it possible to record and centralise the bets.

"User" designates a person who participates in the game by placing a bet in the hope of collecting winnings.

"Agent" designates a person who records bets on behalf of a gambling operator.

Gambling terminals are known comprising image acquisition means, a processing unit, a touch screen and a printer.

To record a bet, a user hands over a gambling slip to the agent. The agent introduces the slip into the terminal. The terminal acquires an image of the gambling slip. The processing unit detects the information written on the gambling slip and transmits said information to the remote central server for recording. The central server records the bet and sends back to the terminal a registration number. The terminal prints out a gambling receipt, which is handed back to the user.

To find out his winnings, the user must again hand over the gambling receipt to an agent. The agent introduces the receipt into the terminal. The terminal acquires an image of the receipt. The processing unit detects the registration number written on the receipt and interrogates the remote central server. The central server sends back to the terminal the result of the winnings of the user.

The touch screen enables the agent of the point of sale to select a game during the recording of the transaction, to view or correct the information detected, and to command the transaction.

In certain terminals, the image acquisition means are formed of a scrolling scanner.

The agent runs the gambling slip or the receipt through the scanner of the terminal. The document is scrolled in the scanner and is deposited in a receptacle.

Terminals in which the image acquisition means comprise a digital camera have also been proposed.

In these terminals, the slip is simply laid down by the agent on a surface of a mount and an image of the slip is acquired by a digital camera. These terminals make it possible to acquire an image of the gambling slip in a rapid manner.

However, said terminals do not always make it possible to detect the information depicted on the gambling slips in a reliable manner. This problem can stem from an incorrect positioning of the slip in relation to the camera.

The document WO 2006/099504 A2 describes a gambling terminal comprising a camera and a light source projecting a pattern onto the gambling slip. The agent uses the projected pattern as a mark to correctly position the gambling slip in relation to the camera.

The aforementioned detection problem can also be due to flatness defects of the slip, which lead to distortions in the acquired image.

In addition, terminals with digital camera are particularly sensitive to parasitic light coming from the surrounding environment.

Furthermore, whatever the image acquisition technique used, it is always the agent of the point of sale who handles the gambling slip or the receipt and who introduces it into the terminal. It is thus not always possible for the user to control all of the different operations carried out by the agent.

Yet, a malicious agent can substitute another receipt for the receipt handed over by the player.

For this reason there also exists checker terminals installed in the points of sale, which enable users to check by themselves if their gambling receipts are winning ones. The user places his receipt under a bar code reader of the checker terminal, the terminal interrogates the central server and a message then appears on a screen indicating if the receipt is a winning one. If this is the case, the player then presents his receipt to the agent for payment.

With the exception of checker terminals, limited in their functions, present gambling terminals are used uniquely by agents acting on behalf of the gambling operator. This leads to a lack of transparency of part of the transaction vis-à-vis the user, particularly during checking of the receipts before payment.

DESCRIPTION OF THE INVENTION

An aim of the invention is to enable users to control the transactions better.

This problem is resolved within the scope of the present invention thanks to a gambling terminal, comprising a mount for receiving a gambling document belonging to a user and a camera able to acquire an image of the gambling document when the gambling document is placed on the mount, the terminal having a first side intended to face an agent and a second side, opposite the first side and intended to face the user, in which the terminal has a first opening arranged on the first side and a second opening arranged on the second side, such that the gambling document can be seen simultaneously by the agent and the user while the image is being acquired.

With such a terminal, the gambling document can be seen by the user so that the user can easily control the course of events of the acquisition operation.

"Gambling document" designates any document intended to be read by a gambling terminal, such as a gambling slip on which a user writes the data of the bet or a gambling receipt printed out by a gambling terminal summarising the data of the bet.

The terminal may have the following characteristics:

- the terminal comprises a cavity, the mount extending inside the cavity, and the cavity may be accessed by the agent and by the user via the first opening, respectively the second opening,
- the terminal comprises user interface means oriented such that the user views the information displayed on the interface means,
- the user interface means comprise a touch screen enabling the user to validate and/or correct the information displayed,
- the terminal comprises a processing unit, said processing unit being able, from the acquired image, to extract the information depicted on the gambling document,
- the terminal comprises a lighting device able to project onto the gambling document a reference pattern, and a processing unit able to correct the acquired image as a function of any deformation of the pattern present in the acquired image, the terminal comprises means for laying flat the gambling document on the mount, the terminal comprises a casing in which are housed the mount, the camera and a processing unit, the processing unit is arranged under the mount, the terminal comprises an enclosure delimiting a cavity in which extends the mount, the terminal comprises lateral walls extending on either side of the first and the second openings, the screen blacks out at least in part the light emitted in the direction of the mount.

DESCRIPTION OF DRAWINGS

Other characteristics and advantages will become clearer from the following description, which is purely illustrative and non limiting and should be read with reference to the appended figures, among which.

DETAILED DESCRIPTION OF AN EMBODIMENT

Figure 1:
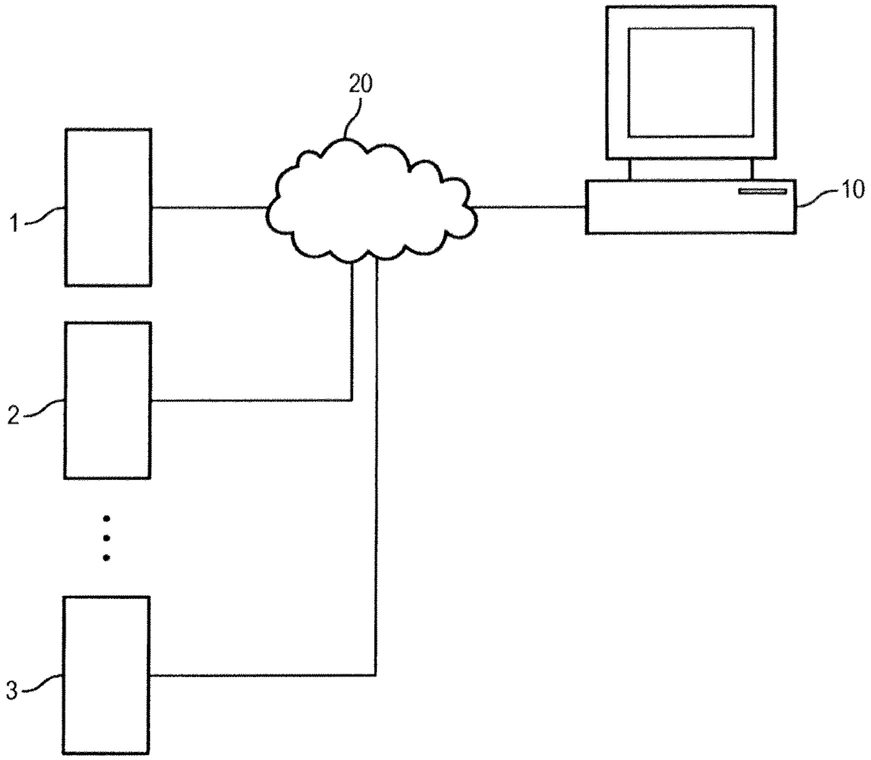
FIG. 1 represents in a schematic manner a gambling system.

In FIG. 1, the gambling system comprises a central server managed by a gambling operator and a plurality of gambling terminals 1, 2, . . . N located in different points of sale in retail outlets. The gambling terminals are able to exchange data with the remote central server 10 via a communications network 30.

The gambling terminals 1, 2, . . . N enable the bets to be collected. The central server 10 records and centralises all of the bets collected by the gambling terminals.

Figure 2:
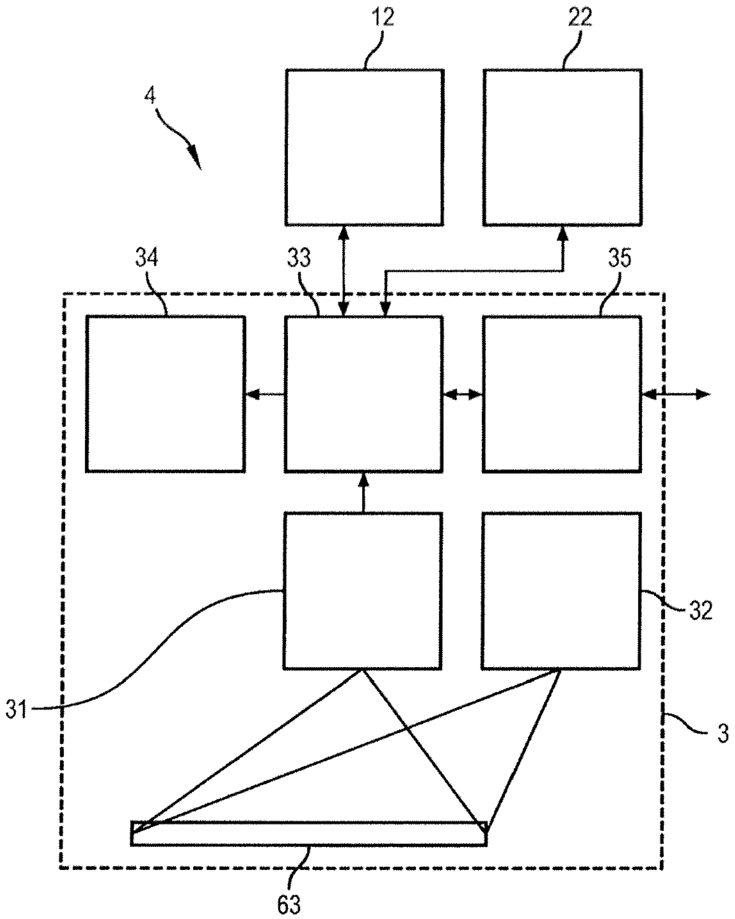
FIG. 2 schematically represents different equipment of a gambling terminal.

In FIG. 2, the gambling terminal 1 schematically comprises a casing 3, a mount 63, image acquisition means in the form of a digital camera 31, a light source 32, a processing unit 33, an agent interface in the form of a touch screen 12, a user interface in the form of a touch screen 22, receipt printing means in the form of a printer 34 and a communication interface 35 to exchange data with the remote central server. The mount, the image acquisition means, the light source, the printing means and the communication interface are housed 5 in the casing 3.

Figure 3:
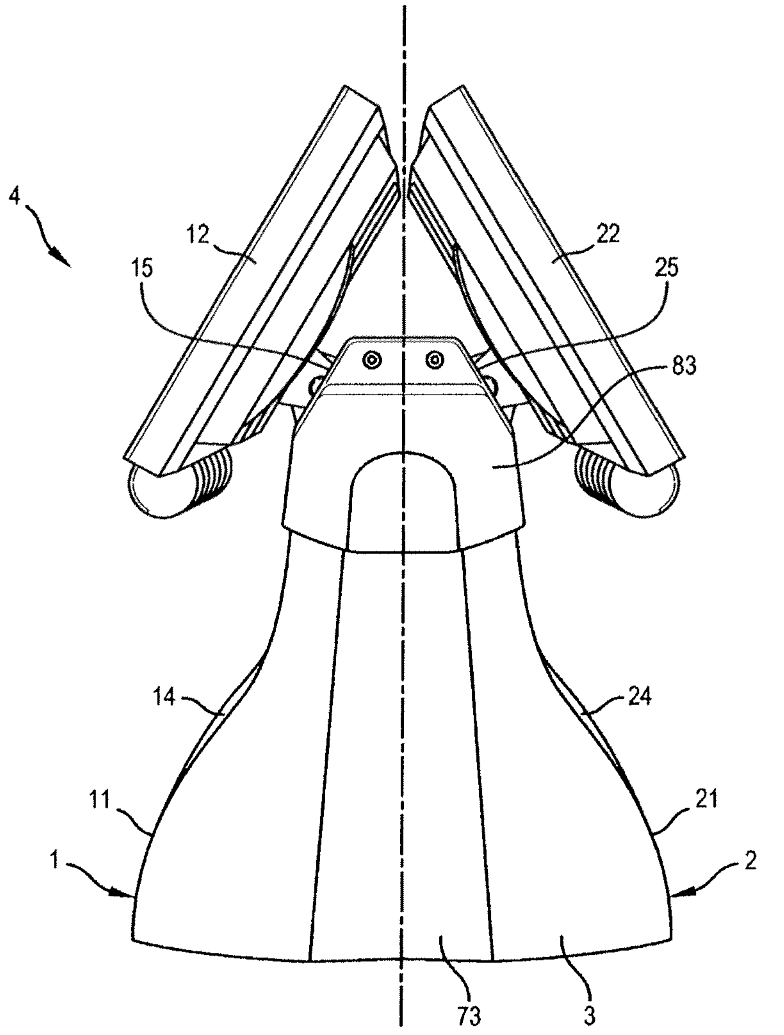
FIGS. 3 and 4 represent in a schematic manner, in perspective, a gambling terminal according to an embodiment of the invention.
Figure 4:
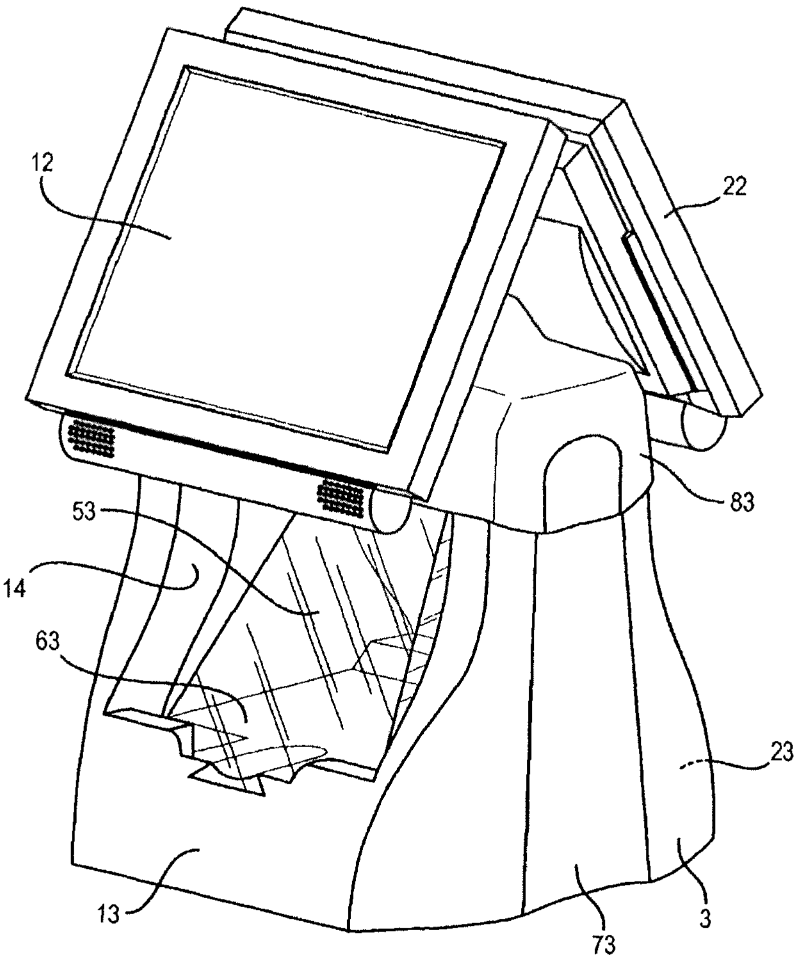
Figure 5:
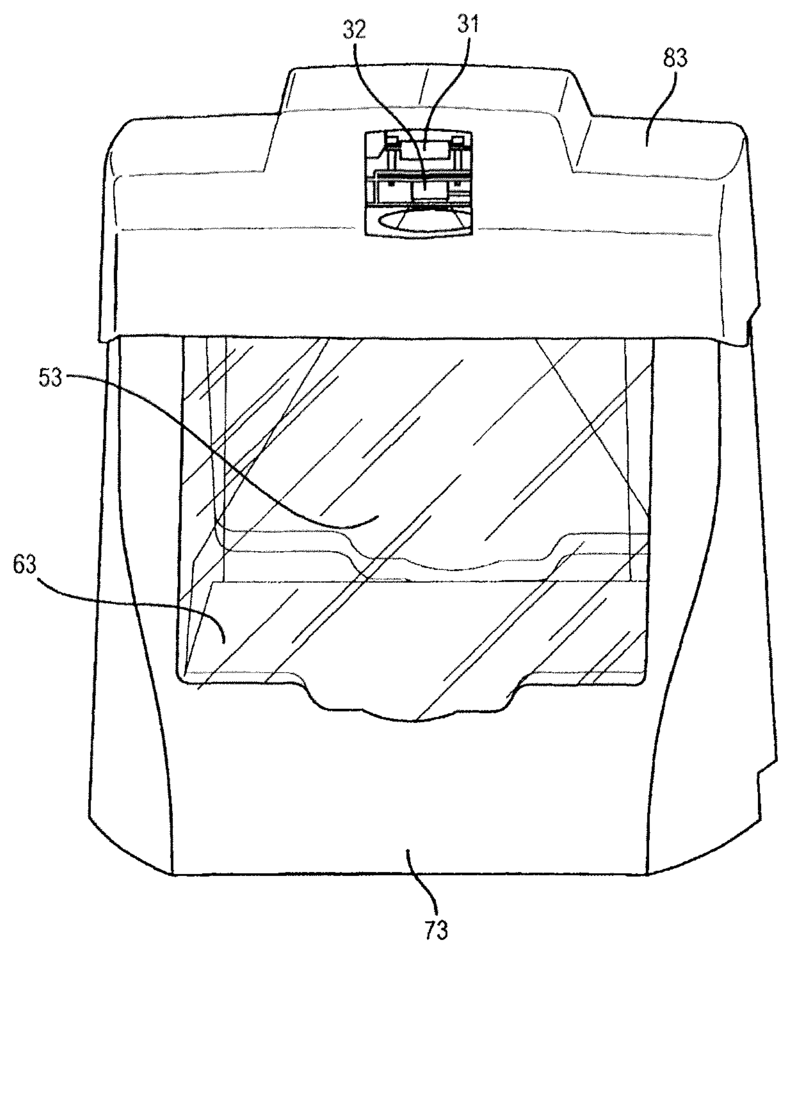
FIG. 5 represents in a schematic manner, in perspective, the terminal without the screens.

In FIGS. 3 to 5, the gambling terminal 4 is symmetrical in relation to a plane P. Said plane P divides the terminal 4 into a first part 1 (front part) extending on one side of the plane P, and a second part (rear part) extending on another side of the plane P. The first part 1 has a first side 11 (front side) intended to face an agent and the second part 2 has a second side 21 (rear side) intended to face the user. Thus, the terminal 4 may be used equally well by the agent and by the user.

The gambling terminal 4 comprises the casing 3 and the two touch screens 12 and 22 surmounting the casing 3. The casing 3 comprises a front wall 13 forming the first side, a rear wall 23 forming the second side and two lateral walls 43. The walls 13, 23, 43 define an enclosure surrounding a cavity 53 for presenting a gambling document.

The terminal 4 also comprises the document mount extending inside the cavity 53. The mount 63 includes a reception surface on which may be laid a gambling document belonging to a user for acquisition.

The front wall 13 has a first opening 14 and the rear wall 23 has a second opening 24, such that the cavity 53 is accessible both by the agent via the first opening 14, and by the user via the second opening 24.

When a gambling document is laid down on the mount in the enclosure, the document can be seen simultaneously by the agent and the user through the openings 14, 24. The manipulations of the document 30 carried out by the agent can be seen by the user and vice versa.

The casing 3 has a lower part 73 (or base) and an upper part 83. The lower part 73 of the casing contains the data processing unit 33. The upper part 3 of the casing contains the digital camera 31 and the lighting device 32. In addition, the upper part 83 supports the two touch screens 12 and 22.

The lower part 63 (or base) of the casing 3, which contains the processing unit, is wider than the upper part, which supports the two touch screens 12, 22. The base 73 thus ensures good stability of the terminal 4, whereas the upper part 83 thins out to present minimum bulk and to leave place for the screens 12, 22.

The casing 3 comprises, at its upper part 83, means for attaching 15, 25 screens 12, 22 on the casing 3. The screens 12, 22 are arranged on either side of the symmetry plane P. A first screen 12 extends from the first side 11 of the casing 3 so as to be visible by the agent, whereas a second screen 22 extends from the second side 21 of the casing 3 so as to be visible by the user facing it. The screens 12, 22 make it possible to display information viewed simultaneously by the agent and by the user. Moreover, the agent and the user can each interact with their respective screens to validate and/or correct the displayed information.

The first screen 12 and the second screen 22 extend above respectively the first opening 14 and the second opening 24. In this configuration, the agent and the user can each view simultaneously a screen 12, 22 and the gambling document laid on the mount 63.

The first and second screens 12, 22 are inclined in relation to the symmetry plane P. The screens 12, 22 are oriented to enable comfortable viewing and use for the agent and the user.

In addition, the screens 12, 22 are arranged to black out at least in part the ambient light emitted in the direction of the mount 63, coming in particular from the ceiling of the room in which the terminal is installed.

Thus the walls 13, 23, 43 of the cavity 53 and the screens 12, 22 30 contribute to cutting out parasite light rays likely to perturb the image acquisition.

The digital camera 31 and the lighting device 32 are housed in the upper part 83 of the casing 3, above the mount 63. The mount 63 and the camera 31 are positioned on either side of the cavity 53. The camera 31 faces the mount 63 so as to enable the acquisition of an image of the gambling document.

The lighting device 32 lights the reception surface of the mount 63. Moreover, the lighting device 32 projects onto the gambling document a reference pattern (or test pattern). The processing unit is programmed to execute an image rectification algorithm making it possible to correct the acquired image as a function of deformation of the reference pattern present in the acquired image. Thus, when the gambling document is not flat (the document has deformations, particularly due to folds), the processing unit generates a corrected image of the document, which improves the reliability of the extraction of information.

Finally, the terminal 4 may comprise means for laying flat the gambling document on the mount. Said means may for example comprise a suction device creating a low pressure between the reception surface and the document, or an electrostatic charge generation device.

The terminal 4 has the advantage of being one piece: all of the equipment is housed or supported by a single casing. The terminal 4 is adapted to be positioned between the agent and users in a point of sale, on a counter for example.

To participate in a game of chance, such as a lottery game for example, a user fills out a gambling slip. On the slip is for example a grid in which numbers are written. The user selects numbers by ticking the boxes of the grid.

Figure 6:
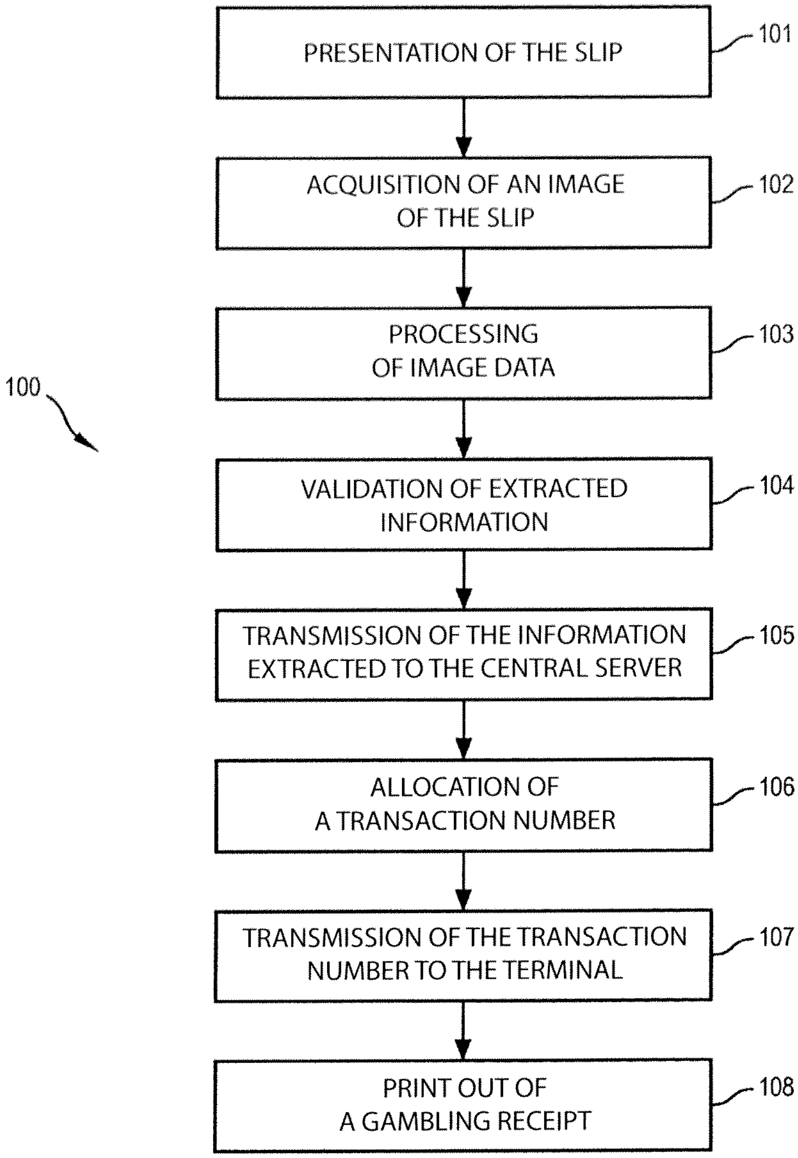
FIGS. 6 and 7 represent in a schematic manner steps of a gambling method and steps of a winnings checking method.

The user takes the slip to a point of sale. As is represented in FIG. 6, the user introduces the slip into the cavity 53 of the terminal 4 via the second opening 24 and lays it on the mount 63 (step 101). Alternatively, the user hands over the slip to an agent and it is the agent who introduces the document into the cavity 53 of the terminal 4 via the first opening 14. In the case where the user himself introduces the slip, he is assured that no substitution of his slip has taken place at the moment of presentation of the slip.

The processing unit 33 commands the camera 31 so that the camera acquires an image of the gambling slip (step 102). The acquisition may be triggered automatically, by detection of the presence of the slip on the mount, or manually by the agent.

The image data acquired by the camera 31 is transmitted to the processing unit 33 to be processed. The processing unit 33 extracts image data from the information depicted on the gambling slip (step 103). This information comprises in particular the type of game and the numbers selected by the user depicted on the slip.

Then, the processing unit commands the screens 12, to display the extracted information. The screens 12, 22 simultaneously display the information, such that the agent and the user can see it.

The agent and/or the user have the possibility of checking and correcting the information displayed, before validating it (step 104) using the touch screen 12, 22.

Once the agent and/or the user have validated the information displayed, the processing unit 33 transmits the information to the remote central server (step 105). The central server 10 records the information associated with the transaction, said information including the gambling data and the date, the time of the transaction and the point of sale. The central server 10 allocates a number to the transaction (step 106). The central server 10 transmits to the processing unit 33 the transaction number (step 107).

When receives the transaction number, the processor 33 commands the printer 34 for the print out of a summary receipt on which is written all of the data of the transaction and a bar code corresponding to the transaction number (step 108).

The agent hands over to the user the receipt, which provides proof of the recording of the participation of the user in the game.

Figure 7:
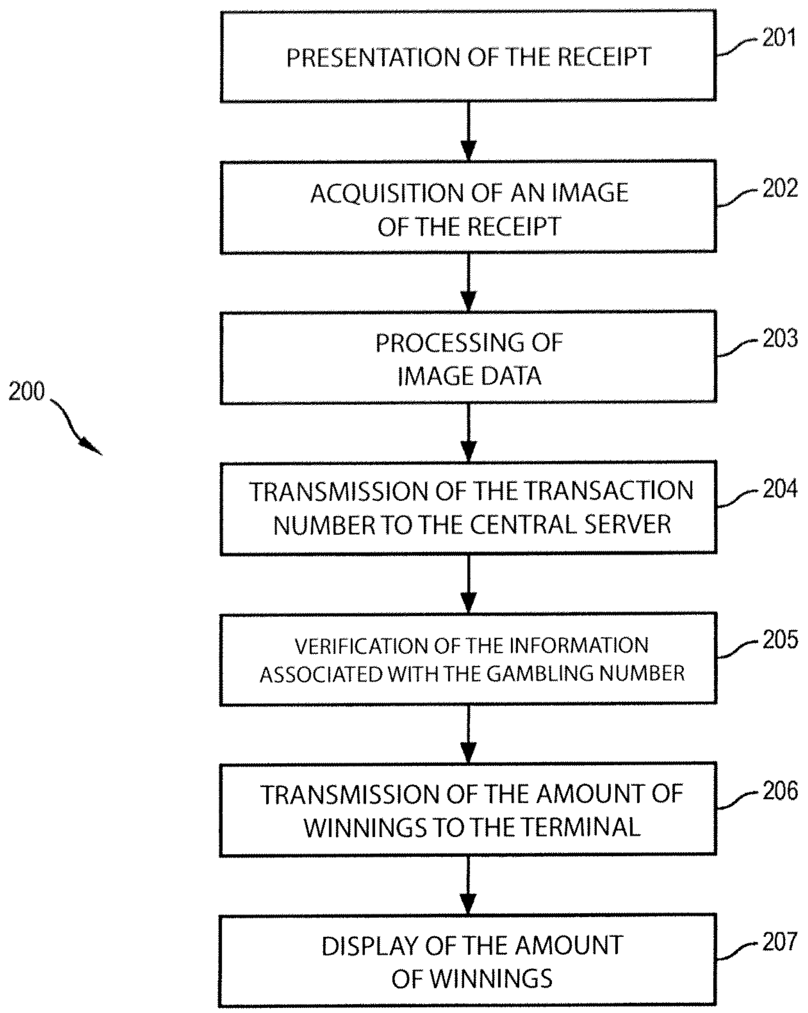

Later, the user can go to a point of sale to check if the receipt is a winning one. As is represented in FIG. 7, the user introduces the receipt into the cavity 53 of the terminal 4 via the second opening 24 and lays it on the mount 63 (step 201). Alternatively, the user hands over the receipt to an agent, who introduces it into the cavity 53 of the terminal 4 via the first opening 14 and lays it on the mount 63. In the case where the user himself introduces the receipt, he is assured that no substitution of his receipt has been made at the moment of presentation of the receipt.

The processing unit 33 commands the camera so that the camera acquires an image of the receipt (step 202). The acquisition may be triggered automatically, by detection of the presence of the receipt on the mount, or manually by the agent.

During the acquisition of the image, the receipt remains visible for the user, thanks to the second opening 24. The user is thus assured that no substitution of his receipt has taken place.

The image data acquired by the camera 31 is transmitted to the processing unit 33 to be processed. The processing unit 33 corrects the image data and extracts from the image data the type of game and the transaction number. The terminal 4 interrogates the remote central server 10 (step 203).

The central server 10 contains all of the data of the transactions carried out by users for a same game.

From the transaction number, the server 10 determines whether the receipt is a winning one and determines if appropriate the corresponding amount of winnings (step 205). The server 10 transmits the result to the terminal 4 (step 206).

The terminal 10 receives the result and displays the result on the screens 12, 22 (step 207).

The user can follow the different operations carried out by the agent. He can moreover view or validate the information displayed on the screen at the same time as the agent.

Apart from gambling documents, the terminal that has just been described can also be used for the recognition and checking of other documents, particularly secure documents, such as bank notes for example.

The invention claimed is:

1. A gambling terminal, comprising:

a casing having a front wall intended to face an agent, a rear wall, opposite the front wall, and intended to face a user, and two lateral walls, a mount housed in the casing, for receiving a gambling document belonging to the user, and a camera housed in the casing, for acquiring an image of the gambling document when the gambling document is placed on the mount, wherein the front wall has a first opening and the rear wall has a second opening configured such that the gambling document can be seen simultaneously by the agent through the first opening and by the user through the second opening while the image is being acquired;

a lighting device able to project onto the gambling document a reference pattern; and a processing unit able to correct the image acquired as a function of a deformation of the reference pattern present in the acquired image.

2. Terminal according to claim 1, wherein the walls of the casing define an enclosure surrounding a cavity, the mount extending inside the cavity, and wherein the cavity is accessible by the agent and by the user via the first opening and the second opening, respectively.

3. Terminal according to one of claim 1 or 2, comprising user interface means oriented such that the user views the information displayed on the interface means.

4. Terminal according to claim 3, in which the user interface means includes a touch screen enabling the user to validate and/or correct the information displayed.

5. Terminal according to claim 1, comprising a processing unit, said processing unit being able, from the acquired image, to extract information depicted on the gambling document.

6. Terminal according to claim 1, comprising means for laying flat the gambling document on the mount.

7. Terminal according to claim 1, comprising a processing unit housed in the casing.

8. Terminal according to claim 7, wherein the processing unit is arranged under the mount.

9. Terminal according to claim 2, wherein the lateral walls extend on either side of the first and the second openings.

10. Terminal according to claim 4, wherein the screen blacks out at least in part the light emitted in the direction of the mount.

11. Gambling system, comprising at least one terminal according to claim 1 and a remote central server, in which the terminal is able to acquire an image of a gambling document and to transmit the corresponding information to the central server.

12. Gambling method according to which a gambling terminal according to claim 1 acquires an image of a gambling document and transmits the corresponding information to a remote central server.

* * * * *